United States Patent [19]

Gellert

[11] Patent Number: 5,494,433
[45] Date of Patent: Feb. 27, 1996

[54] INJECTION MOLDING HOT TIP SIDE GATE SEAL HAVING A CIRCUMFERENTIAL RIM

[76] Inventor: Jobst U. Gellert, 7A Prince Street, Georgetown, Ontario, Canada, L7G 2X1

[21] Appl. No.: 463,970

[22] Filed: Jun. 5, 1995

[51] Int. Cl.$^6$ .................................................. B29C 45/20
[52] U.S. Cl. .................. 425/549; 264/297.2; 264/328.8; 264/328.15; 425/572
[58] Field of Search ................................. 425/549, 572; 264/328.15, 297.2, 328.8

[56] References Cited

U.S. PATENT DOCUMENTS

| | | | |
|---|---|---|---|
| 4,795,338 | 1/1989 | Gellert | 425/549 |
| 4,981,431 | 1/1991 | Schmidt | 425/549 |
| 5,324,191 | 6/1994 | Schmidt | 425/549 |
| 5,326,251 | 7/1994 | Gellert | 425/549 |

*Primary Examiner*—Tim Heitbrink
*Attorney, Agent, or Firm*—Dalesman & Company

[57] ABSTRACT

Injection molding apparatus having a number of side gate seals extending outwardly from a heated central nozzle to convey melt to cavities spaced around the nozzle. Each side gate seal has an inner end seated in a front portion of the nozzle and extends outwardly across an insulative air space into a radial opening in a cooled mold leading to a gate to a respective cavity. Each side gate seal has a pointed tip in alignment with the gate and a cylindrical sealing rim which fits in a matching cylindrical portion of the radial opening in the mold. This seal around the side gate seal locates the nozzle longitudinally while allowing the cylindrical sealing rim to slide slightly inwardly and outwardly to allow for thermal expansion and contraction of the side gate seal.

1 Claim, 2 Drawing Sheets

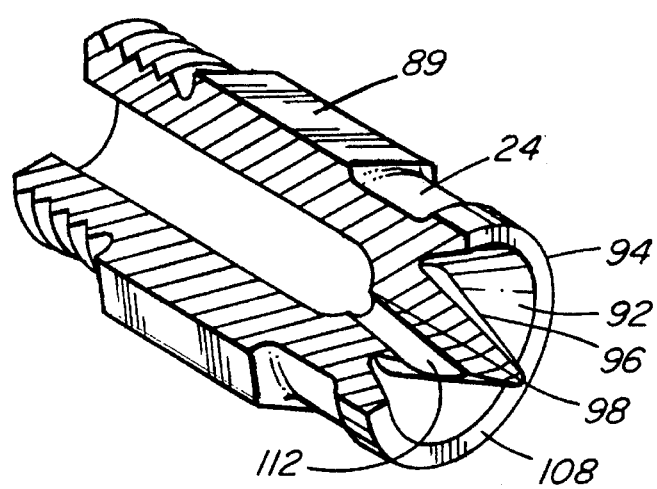
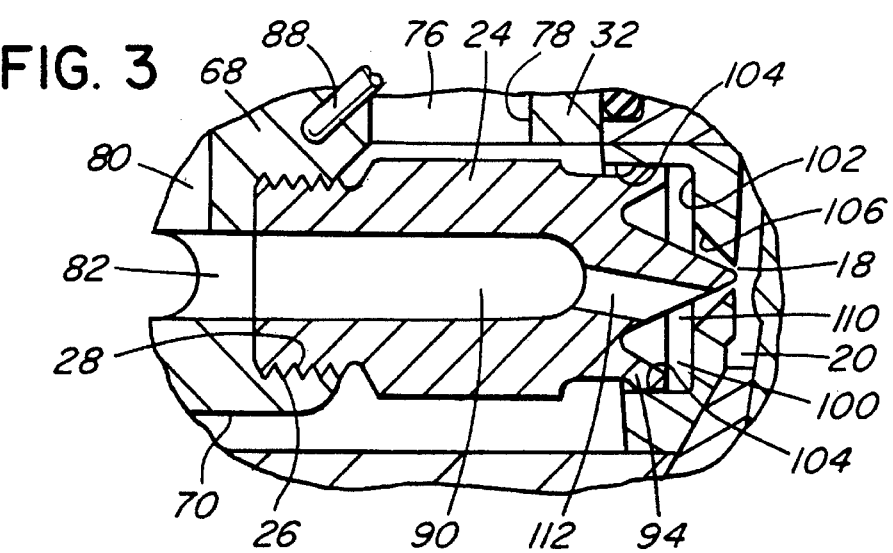
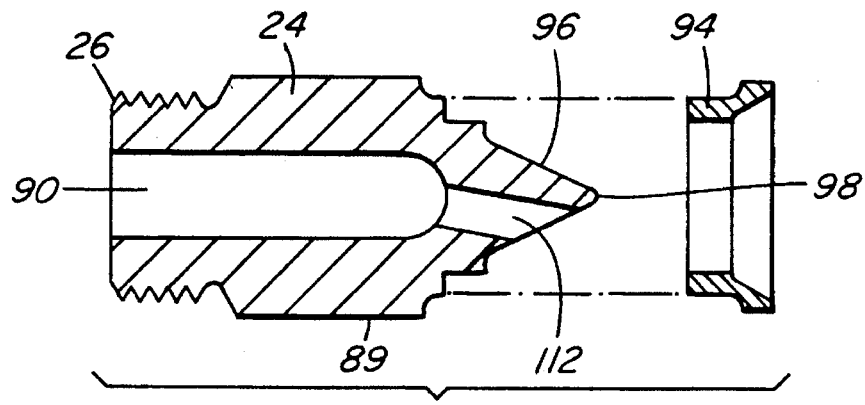

5,494,433

INJECTION MOLDING HOT TIP SIDE GATE SEAL HAVING A CIRCUMFERENTIAL RIM

BACKGROUND OF THE INVENTION

This invention relates generally to injection molding and more particularly to apparatus for side gating from a heated nozzle to a number of cavities spaced around the nozzle through side gate seals, each of which have a hot tip.

As seen in the applicant's U.S. Pat. No. 4,795,338 which issued Jan. 3, 1989, hot tip gating from a nozzle to a single gate on the longitudinal axis of the nozzle is well known. Edge gating from a nozzle through a number of edge gate seals is also well known, as seen in U.S. Pat. No. 4,981,431 to Schmidt which issued Jan. 1, 1991. While these previous seals have an outer sealing flange or rim, in order to prevent melt leakage it is necessary to provide sealing contact between the outer face of the rim and the mold. A space is provided around the circumference of the sealing rim to allow for longitudinal thermal expansion and contraction of the nozzle. While this is satisfactory for some applications, it has the disadvantage that it is difficult to provide the close tolerances necessary to ensure a tight seal between the outer face of the rim and the mold. Also, different operating temperatures for different applications results in different thermal expansion of the edge gate seals.

SUMMARY OF THE INVENTION

Accordingly, it is an object of the present invention to at least partially overcome the disadvantages of the prior art by providing injection molding apparatus having side gate seals with a hot tip wherein the seal is provided between a cylindrical sealing rim and a surrounding cylindrical portion of a radial opening in the mold leading to the gate.

To this end, in one of its aspects, the invention provides side gated injection molding apparatus having at least one heated nozzle located in a mold, the at least one heated nozzle having a rear end, a front portion with a front end and a generally cylindrical outer surface extending through a central opening in the mold, the central opening in the mold having a generally cylindrical inner surface with an insulative air space provided between the outer surface of the front portion of the at least one heated nozzle and the inner surface of the central opening in the mold, the at least one heated nozzle having a melt channel extending therein to convey melt to fill a plurality of cavities spaced in the mold around the central opening, the melt channel having a central portion extending from the rear end of the at least one heated nozzle and a plurality of radial portions branching outwardly from the central portion adjacent the front end of the front portion of the at least one heated nozzle, each radial portion of the melt channel extending in alignment with a respective gate extending in the mold to one of the cavities, a plurality of spaced side gate seals, each having an inner end, an outer end, and a bore therebetween, the inner end being seated in the front portion of the at least one heated nozzle with the side gate seal extending radially outwardly across the insulative air space in alignment between a respective radial portion of the melt channel and a respective gate to convey melt outwardly from the melt passage to the gate to fill the cavity, the improvement wherein each side gate seal has an outer end with a cylindrical sealing rim extending around a conical central portion with a pointed tip, the mold has a radial opening leading to each gate, each radial opening has a surface with an outer cylindrical portion extending concentrically with the gate and an inner portion extending between the outer cylindrical portion and the gate, the side gate seals being mounted with the outer end of each side gate seal received in a respective one of the radial openings with the cylindrical sealing rim of the side gate seal fitting in the cylindrical portion of the radial opening whereby sealing contact between each sealing rim and the surrounding cylindrical portion of the radial opening in the mold locates the nozzle with the pointed tip of each side gate seal accurately aligned with a respective gate and forms a sealed circular space between the inner portion of the surface of the radial opening and the conical central portion of the side gate seal, the bore through each side gate seal having a portion extending diagonally to convey melt into the sealed circular space, from which sealed circular space the melt flows outwardly around the pointed tip of the side gate seal and through the aligned gate to the cavity.

Further objects and advantages of the invention will appear from the following description taken together with the accompanying drawings.

BRIEF DESCRIPTION OF THE DRAWINGS

FIG. 2 is an isometric view of one of the side gate seals seen in FIG. 1, FIG. 3 is a sectional view clearly showing a seal is provided around the sealing rim of the same side gate seal, and FIG. 4 is a sectional view showing assembly of a side gate seal according to another embodiment of the invention.

DETAILED DESCRIPTION OF THE INVENTION

Figure 1:
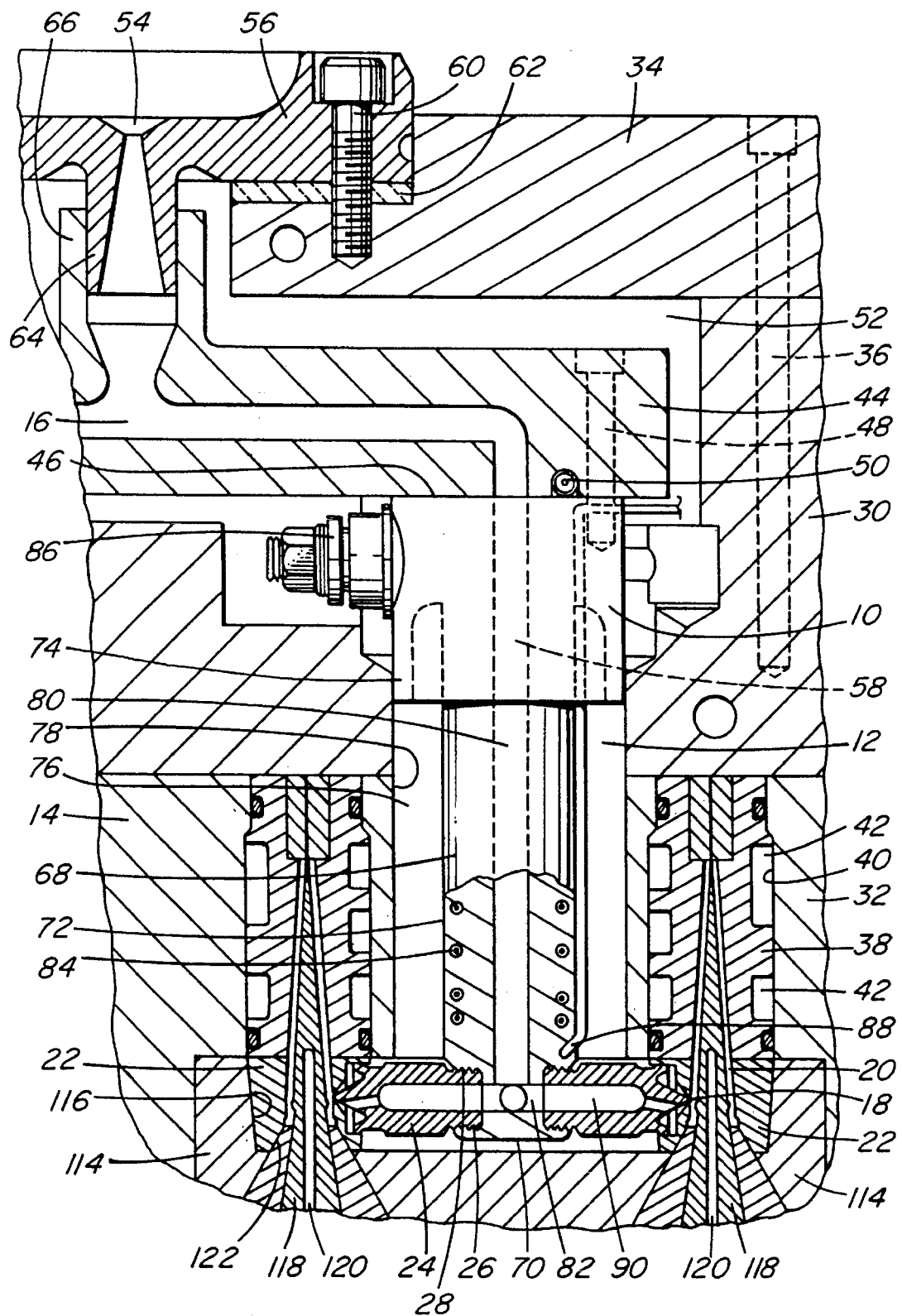
FIG. 1 is a sectional view of a portion of a side gated injection molding system according to one embodiment of the invention.

Reference is first made to FIG. 1 which shows a portion of a multi-cavity side gated injection molding system or apparatus in which several steel nozzles 10 are mounted in cylindrical openings 12 in a mold 14 to convey pressurized melt through a melt passage 16 to gates 18 leading to cavities 20 in the mold. In this embodiment, several elongated cavities 20 are spaced around each nozzle 10 and each gate 18 extends through a gate insert 22 seated in the mold 14. Each gate 18 is aligned with a side gate seal 24 according to the invention as described in more detail below. In this embodiment, the side gate seal 24 has a threaded inner end 26 which is screwed into a threaded seat 28 in the nozzle 10.

While molds have a wide variety of configurations, in this case a spacer plate 30 is mounted between a cavity plate 32 and a back plate 34 which are secured together by screws 36 in a conventional manner. The spacer plate 30 and cavity plate 32 are precisely aligned by dowel pins (not shown). In this arrangement, each elongated cavity 20 extends partially in the gate insert 22 and partially in a cavity insert 38 against which the gate insert 22 is securely mounted. A number of the cavity inserts 38 are spaced around each nozzle 10 in holes 40 in the cavity plate 32. Cooling water is pumped through cooling conduits 42 extending around each cavity insert 38 to provide cooling between the heated nozzle 10 and the cavities 20.

The nozzles 10 are interconnected by a steel melt distribution manifold 44 which extends between the spacer plate 30 and the back plate 34 and is secured against the rear ends 46 of the nozzles 10 by screws 48. The melt distribution manifold 44 is heated by an integral electrical heating element 50 and an insulative air space 52 is provided between it and the surrounding cooled spacer plate 30 and back plate 34. The melt passage 16 receives melt from a molding machine (not shown) through a central inlet 54 in a locating ring 56 seated in the back plate 34 and branches out in the manifold 44 to pass through a melt channel 58 which extends longitudinally in each of the nozzles 10. The locating ring 56 is secured in place by screws 60 which extend through an insulation ring 62 formed of a suitable glass-epoxy material into the back plate 34. The locating ring 56 has a sprue stem 64 projecting into a cylindrical inlet portion 66 of the heated manifold 44 to allow for movement of the manifold 44 and the screw mounted nozzles 10 during installation and to provide for thermal expansion and contraction as described below.

Each nozzle 10 has a front portion 68 with a front end 70 and a generally cylindrical outer surface 72. The nozzle 10 has an insulation and location flange portion 74 which fits in the cylindrical opening 12 in the spacer plate 30. This accurately locates the front portion 68 of the nozzle 10 centrally between the cavities 20 and provides an insulative air space 76 between the outer surface 72 of the front portion 68 of the nozzle 10 and the surrounding cylindrical inner surface 78 of the central opening 12. The melt channel 58 in the nozzle 10 has a central portion 80 extending from the rear end 46 to a number of radial portions 82 which branch outwardly adjacent the front end 70 of the front portion 68 of the nozzle 10. The nozzle 10 is heated by an integral electrical heating element 84 which extends around the central portion 80 of the melt channel 58 and has an external terminal 86. A thermocouple element 88 extends into the nozzle 10 near the front end 70 to monitor the operating temperature.

Each side gate seal 24 is screwed into the threaded seat 28 in the front portion 68 of the nozzle 10 and extends outwardly across the insulative air space 76 around the nozzle 10. It has a hexagonal central portion 89 to be engaged by a wrench to tighten the side gate seal 24 into place. The side gate seal 24 has a melt bore 90 which is aligned to receive melt from one of the radial portions 82 of the melt channel 58 in the nozzle 10. As seen in FIGS. 2 and 3, the side gate seal 24 has an outer end 92 with a cylindrical sealing rim 94 extending around a conical central portion 96 with a pointed tip 98. The mold 14 has a radial opening 100 leading to each gate 18 in which the outer end 92 of the respective side gate seal 24 is received. The radial opening 100 has a surface 102 with an outer cylindrical portion 104 extending concentrically with the gate 18 and an inner portion 106 extending from the outer cylindrical portion 104 to the gate 18. Each side gate seal 24 is mounted with its outer end 92 received in one of the radial openings 100 in the mold 14 with the cylindrical sealing rim 94 of the side gate seal 24 fitting in the cylindrical portion 104 of the radial opening 100. While there is sealing contact between the cylindrical sealing rim 94 and the surrounding cylindrical portion 104 of the radial opening 100, there is no contact between the outer face 108 of the cylindrical sealing rim 94 and the inner portion 106 of the surface 102 of the radial opening 94. Thus, the nozzle 10 is located longitudinally with the pointed tip 98 of each side gate seal 24 accurately aligned with a respective gate 18, but the cylindrical sealing rim 94 of each side gate seal 24 is free to slide slightly inwardly and outwardly in the surrounding cylindrical portion 104 of the respective radial opening 100 to allow for thermal expansion of the side gate seal 24. The sealing contact between the cylindrical sealing rim 94 and the surrounding cylindrical portion 104 of the radial opening 100 also forms a sealed circular space 110 between the inner portion 106 of the surface 102 of the radial opening 100 in the mold 14 and the conical central portion 96 of the outer end 92 of the side gate seal 24. As seen in FIG. 3, the melt bore 90 through the side gate seal 24 has a diagonal portion 112 which extends outwardly to convey melt into the sealed circular space 110. The melt then flows from the sealed circular space 110 outwardly around the pointed tip 98 of the side gate seal 24 and through the aligned gate 18 to the cavity 20. In this embodiment, the outer end 92 of each side gate seal 24 extends outwardly past the inner surface 78 of the central opening 12 in the mold 14 a sufficient distance to provide room for the cooling conduits 42 extending between the nozzle 10 and the cavities 20.

During assembly, in this embodiment the nozzles 10 are each attached to the manifold 44 by the screws 48. Each nozzle 10 is mounted with its front portion 68 projecting through the opening 12 in the mold 14. The nozzles 10 and attached manifold 44 are advanced forwardly to provide room for the side gate seals 24 to be easily screwed into place in the threaded seats 28. The manifold 44 and attached nozzles 10 are then retracted to the position shown in FIG. 1 and a gate insert 22 is mounted in place on each side gate seal 24 by inserting it upwardly and then sliding it radially inward over the outer end 92 of the side gate seal 24. A gate insert retainer plate 114 is then secured in place by screws (not shown). The gate insert retainer plate 114 has recesses 116 therein in which the gate inserts 22 are received. This holds the gate inserts 22 in place which in turn locate the nozzles 10 in the retracted assembled position. The recesses 116 in the gate insert retainer plate 114 and the inserts 22 are tapered to provide for easy assembly and ensure a tight fit. Finally, the cavity cores 118 with central cooling conduits 120 are secured in place extending through a hole 122 in each gate insert 22 into the adjacent cavity insert 38. Of course, the nozzle 10 and side gate seals 24 are removable for cleaning or replacement by reversing this procedure.

In use, after installation in the mold 14 as seen in FIG. 1, electrical power is applied to the heating element 50 in the manifold 44 and to the heating elements 84 in the nozzles 10 to heat them to a predetermined operating temperature. As described above, the nozzles 10 are located longitudinally by the circumferential sealing rims 94 of the side gate seals 24 being seated in the radial openings 100 in the gate inserts 22. When the system is heated up, thermal expansion of the nozzles 10 causes the floating manifold 44 to move slightly rearwardly. This movement is accommodated by the nozzle stem 64 of the locating ring 56 sliding inside the heated cylindrical inlet portion 66 of the manifold 44 and by the insulation and location flange portion 74 of each nozzle 10 sliding in the central opening 12 in the spacer plate 28. While a system having a number of nozzles 10 is shown, in other embodiments having only a single nozzle no melt distribution manifold is required and the rear end of the nozzle retracts and advances slightly to provide for thermal expansion and contraction. Pressurized melt is applied from a molding machine (not shown) to the central inlet 54 of the melt passage 16 according to a predetermined cycle. The melt flows through the melt distribution manifold 44, nozzles 10, side gate seals 24, and gates 18 into the cavities 20. After the cavities 20 are filled and a suitable packing and cooling period has expired, the injection pressure is released and the melt conveying system is decompressed to avoid stringing through the open gates 18. The mold 14 is then opened to eject the molded products. After ejection, the mold 14 is closed and the cycle is repeated continuously with a cycle time dependent upon the size of the cavities 20 and the type of material being molded.

FIG. 4 shows a side gate seal 24 according to another embodiment of the invention in which the cylindrical sealing rim 94 is made of a different material than the rest of the side gate seal 24. In this case, the cylindrical sealing rim 94 is made of stainless steel and laser welded in place on the rest of the side gate seal 24 which is made of a copper alloy. The combination of the stainless steel and copper alloy provides the advantage that the high thermal conductivity of the copper alloy improves heat transfer along the conical central portion 96 to and from the pointed tip 98 during the injection cycle without increasing heat loss to the surrounding cooled mold.

While the description of the apparatus in which seals are formed around cylindrical rims 94 of the side gate seals 24 has been given with respect to preferred embodiments, it will be evident that various other modifications are possible without departing from the scope of the invention as understood by those skilled in the art and as defined in the following claims.

The embodiments of the invention in which an exclusive property or privilege is claimed is defined as follows:

1. In a side gated injection molding apparatus having at least one heated nozzle located in a mold, the at least one heated nozzle having a rear end, a front portion with a front end and a generally cylindrical outer surface extending through a central opening in the mold, the central opening in the mold having a generally cylindrical inner surface with an insulative air space provided between the outer surface of the front portion of the at least one heated nozzle and the inner surface of the central opening in the mold, the at least one heated nozzle having a melt channel extending therethrough to convey melt to fill a plurality of cavities spaced in the mold around the central opening, the melt channel having a central portion extending from the rear end of the at least one heated nozzle and a plurality of radial portions branching outwardly from the central portion adjacent the front end of the front portion of the at least one heated nozzle, each radial portion of the melt channel extending in alignment with a respective gate extending in the mold to one of the cavities, a plurality of spaced side gate seals, each side gate seal having an inner end, an outer end, and a bore therebetween, the inner end being seated in the front portion of the at least one heated nozzle with the side gate seal extending radially outwardly across the insulative air space in alignment between a respective radial portion of the melt channel and a respective gate to convey melt outwardly from the melt passage to the gate to fill the cavity, the improvement wherein;

each side gate seal has an outer end with a cylindrical sealing rim extending around a conical central portion with a pointed tip, the mold has a radial opening leading to each gate, each radial opening has a surface with an outer cylindrical portion extending concentrically with the gate and an inner portion extending between the outer cylindrical portion and the gate, the side gate seals being mounted with the outer end of each side gate seal received in a respective one of the radial openings with the cylindrical sealing rim of the side gate seal fitting in the cylindrical portion of the radial opening whereby sealing contact between each sealing rim and the surrounding cylindrical portion of the radial opening in the mold locates the nozzle with the pointed tip of each side gate seal accurately aligned with a respective gate and forms a sealed circular space between the inner portion of the surface of the radial opening and the conical central portion of the side gate seal, the bore through each side gate seal having a portion extending diagonally to convey melt into the sealed circular space, from which sealed circular space the melt flows outwardly around the pointed tip of the side gate seal and through the aligned gate to the cavity.

* * * * *